UNITED STATES PATENT OFFICE.

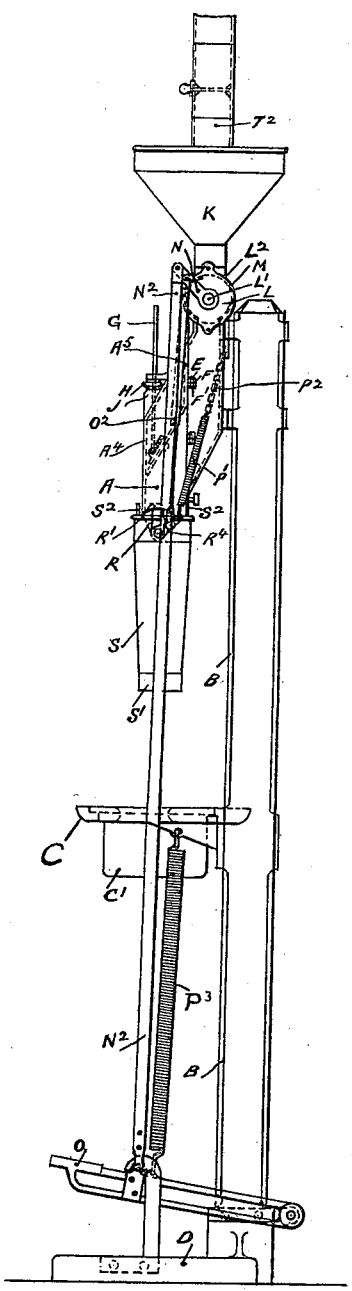

JOHN JAMES MARSHALL, OF LEEDS, ENGLAND.

DRY MEASURER.

975,701. Specification of Letters Patent. Patented Nov. 15, 1910.

Application filed December 18, 1907. Serial No. 407,087.

*To all whom it may concern:*

Be it known that I, JOHN JAMES MARSHALL, a subject of Great Britain, residing at No. 64 Conference road, Armley, in the city of Leeds and county of York, England, have invented new and useful Improvements in Dry Measurers, of which the following is a specification.

This invention relates to measuring quantities of dry goods of a pulverulent or granular nature, and other suitable substances, such as sugar, tea, cereals, and the like, and filling such measured quantities into bags, or other containers, and has particular reference to improved apparatus for effecting such measurement and filling, at the same time, in a simple and efficient manner.

To the end in view apparatus designed according to this invention embodies a measuring chamber having a sloping base, partially sloping top, with upright front and back, and the front portion made so as to be removable for cleaning out, or the like purposes. The top part of the measuring chamber has a contracted portion, abutting on the sloping top and upright back, which is made hollow, across its length to receive a cylindrical or quadrant valve for controlling the inlet to the measuring chamber, which is formed in this contracted part, and above and removably fixed upon this contraction of the measuring chamber is a hopper, and in connection therewith a controlled feed supply.

As it is necessary to provide for the regulation of the capacity of the measuring chamber apart from the definite or pre-determined quantity or factor of measurement the chamber is designed to measure, a co-acting slide is disposed within the chamber, and this slide is characterized by a splayed end or base and upstanding portion, which passes through the sloping top of the measuring chamber, and is vertically adjustable to regulate the capacity of the measuring chamber.

The sloping base of the measuring chamber has an outlet, in connection with which is journaled, upon the measuring chamber, a valve for controlling said outlet, and below this valve and removably fixed upon the measuring chamber, by its top portion, is a filling device, in the form of a spout or funnel, having sides converging to an outlet, for directing the measured goods, from the measuring chamber, into a bag or container placed immediately beneath the outlet.

The operative elements are put in and out of actuation by hand or other power.

In order that the said invention may be more readily understood reference should be made to the following description and accompanying drawings which illustrate apparatus, constructed according to this invention, in which—

Figure 1 is a side elevation, showing a machine having the measuring chamber divided into three separate compartments, each of definite capacity. Fig. 2 is a front elevation thereof. Figs. 3 and 4 show modifications of the inlet valve, and Figs. 5, 6 and 7 are detail views for elucidatory purposes.

A is the measuring chamber, characterized as aforesaid, which is mounted upon or secured to pillar or support B, having a table C and sustained by a base D, adapted for receiving and holding means for the actuation of the apparatus.

Each separate compartment of the measuring chamber is of definite capacity, which is independently variable to compensate in measuring for the varying bulk of certain goods which are subject to atmospheric conditions. In the arrangement illustrated by the drawings, the separate compartments $A^1$, $A^2$, and $A^3$, are adapted to measure approximately 1, 2, and 4 lbs. respectively, and the variations in bulk, and consequently measurement, owing to the causes mentioned, is adjusted by the regulating means.

$A^4$ is the front portion of the measuring chamber A, which is made detachable and to that end is provided with pins or studs E carried by lugs F. Similar lugs $F^1$ are upon the fixed part of the chamber A having holes to receive the said pins when the parts are brought together, and to facilitate this meeting and effect the necessary joint, they are prepared with even surfaces.

$A^5$, $A^6$, and $A^7$, are the slides coacting with the separate compartments of the measuring chamber A, and disposed within the front portion $A^4$ thereof. The vertical adjustment of these slides is effected by means of screw rods G, pivotally connected at their lower ends to the splayed end or base of the slides, and toward their top ends taking into nuts or milled disks H in abutments I upon the front portion $A^4$ of the measuring chamber A, the said slides being adapted to work up and down through the sloping top of the chamber commensurate with the adjustment of the rods.

A⁸ are webs or divisional walls forming or defining the separate compartments, and they are rabbeted or grooved to receive the sides of the adjustable slides and allow of free and easy sliding movement under the action of the screw rods G.

The valve controlling the inlet to the measuring chamber and interposed between the measuring chamber and hopper K is of the type shown in Figs. 1, 2 and 5, or in lieu thereof, of the pattern shown in Figs. 3 and 4. The valve casing in both cases is internally divided to form openings therethrough to register with the openings of the measuring chamber and the hopper K, which is also divided to agree with the openings of the valve.

Referring to Fig. 5, it will be seen that the cutting-off surface of the valve L, within the casing M, approximates a quadrant, is parallel throughout with its axis, and in length is coincident with the valve casing, covers the openings or "inlets" to the measuring chamber, and allows sufficient lap and lead. The valve moves on trunnions L¹, oscillating in brackets or bearings L² and has a strengthening piece L³, carried by the end plates L⁴ of the valve. The right hand trunnion carries an arm N having an extensible coupling O² joined thereto and a branch N¹, pivotally jointed to which is an operating rod N², which passes, and is pivoted in a like manner, to a foot treadle O, which is constrained by a spiral spring P³, or the like resilient means. The opposite trunnion has an arm P upon it connected to one end of an extensible coupling O². R is the valve for controlling the outlet R¹ from the measuring chamber A. This valve is of quadrant shape, that is, its cutting-off surface is parallel throughout with its axis, takes the arc of a circle and the curvature of the outlet R¹ is coincident therewith. The valve R is journaled by trunnions R² in brackets R³, attached to the measuring chamber A in which it is capable of being oscillated, and has arms R⁴ to which are attached the lower parts of the extensible coupling devices O² aforesaid, the upper parts of which are joined to the arms N and P. These extensible couplings comprise rods attached to the arms R⁴ and tubes to the arms N and P, a rod and its respective tube telescoping until the solid end of the tube comes in contact with the end of the rod, which is pressed down, according to the downward movement of the arms N and P, for opening the outlet valve, when operated through the treadle. The arms R⁴ are also joined to spiral springs P¹ anchored by chains P² or other connections to the body of the measuring chamber. These springs are put in tension when the outlet valve R is opened, and are so held while the operative pressure is on.

S is the filling device which is in the form of a funnel or spout removably attachable to the measuring chamber A by clips S², studs, screws, or the like fastening means.

S¹ is the filling outlet which may have its capacity further contracted by a suitable device to be inserted therein, when required.

As previously described, by arranging tubes or other appropriate conductors from the feed supply to the divided hopper K the separate compartments of the measuring chamber A, may be worked independently or collectively, or to interact, that is, any two or more may be worked together while the others remain idle, where the number allows of this, which of course will depend upon the capacity of the chamber A and the number of its compartments. As illustrated by the drawings a convenient arrangement for a three compartment measuring chamber comprises a central passage T and side branching passages T¹ and T², all of which are controlled by suitable valves.

C¹ is a receptacle, for preventing waste of material or goods, which is removably fitted in the table C, so that it can be emptied into the hopper at will.

According to Figs. 3 and 4, the cylindrical inlet valve consists of a cylinder U, divided into hollowed out or open parts U¹, to correspond with the divisions of the valve casing and measuring chamber. In the position shown in Fig. 3, the valve is open. When the solid part is turned over the openings the valve is closed.

The *modus operandi* may be briefly stated as follows:—Normally the outlet valve is closed, and the inlet valve open. On initial depression of the treadle, the cylindrical or quadrant inlet valve is first closed, and on further depression, the outlet valve is opened, by the action of the extensible coupling device O². The measured goods then fall by gravity from the measuring chamber down the spout or funnel, forming the filling device, to the bag or other container. On taking off the pressure, the parts are returned to their normal positions by the reflex action of the springs, the outlet valve being closed and the inlet valve opened, to allow the material to pass to the measuring chamber.

I claim—

An apparatus of the class described comprising a measuring chamber which is divided into compartments, vertically adjustable slides mounted in said measuring chamber, screw rods connected to the slides and measuring chamber, the latter having a detachable front and a contracted upper inlet portion, a superposed hopper having an oscillatory inlet controlling valve, the lower portion of said chamber constituting an outlet, an oscillatory valve for controlling said outlet, extensible couplings connecting the said valves, resilient means joined to the outlet valve and the sides of the measuring chamber, an actuating lever connected to said couplings, and a separate filler removably located below said outlet.

JOHN JAMES MARSHALL.

Witnesses:
   HARRY CROWHER,
   HERBERT DUNN.